F. GOLDSMITH.
Coffee-Roaster.
No. 211,655.    Patented Jan. 28, 1879.
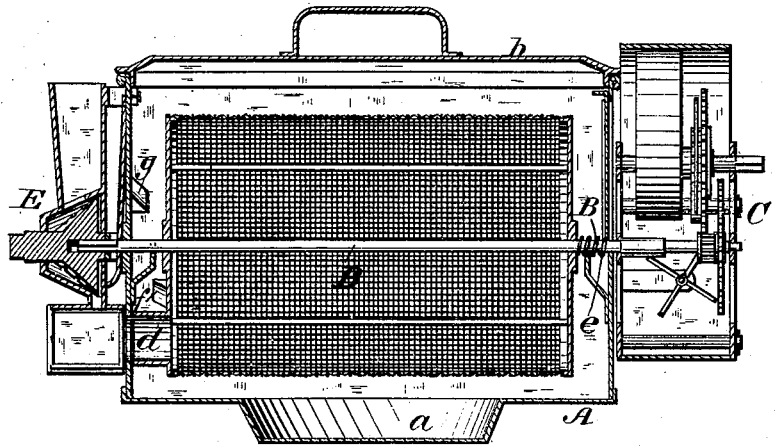
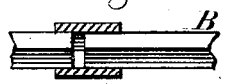
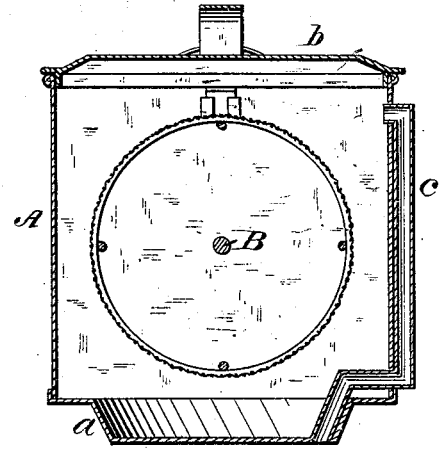
Witnesses:
Donn P. Twitchell
William W. Dodge
Inventor:
Ferdinand Goldsmith
By Dodge & Son
Attys

UNITED STATES PATENT OFFICE.

FERDINAND GOLDSMITH, OF SAGINAW, MICHIGAN.

IMPROVEMENT IN COFFEE-ROASTERS.

Specification forming part of Letters Patent No. 211,655, dated January 28, 1879; application filed December 6, 1878.

*To all whom it may concern:*

Be it known that I, FERDINAND GOLDSMITH, of Saginaw, in the county of Saginaw and State of Michigan, have invented certain Improvements in Coffee Roasting and Grinding Machines, of which the following is a specification:

My invention relates to coffee-roasters in which a drum or cylinder is rotated by means of a spring and train of gearing; and consists in combining therewith a mill or grinder arranged to be driven by the devices which turn the cylinder, and in various details which will be hereinafter described.

Figure 1 represents a longitudinal vertical section of my combined roaster and grinder; Fig. 2, a cross-section of the same; Fig. 3, a detail view, showing one manner in which the grinder may be connected and disconnected at will.

A represents a rectangular sheet-metal case or body, provided with a closely-fitting cover, $b$, and with a circular depression, $a$, in the bottom, to enter a hole in a stove-top. On one side the body is provided with a tube, $c$, opening at its upper end into the body, and at its lower end through the bottom, for the purpose of conducting into the stove the smoke and vapor arising from the coffee within the body. Lengthwise through the body extends a horizontal shaft, B, provided within the body with a gauze or perforated sheet-metal cylinder or drum having sheet-metal ends, one of which is provided with a neck or opening, $d$, through which to introduce and remove the coffee.

As shown in the drawings, the neck $d$ extends outward against the end of the body, so as to be closed thereby, except at a single point, where a corresponding opening is made through the body, as shown in Fig. 1, said opening being closed, as shown, by the drawer or tray of the grinder, as hereinafter described. On one end of the body is mounted a frame, C, containing a train of gear-wheels, connected with a coiled driving-spring and with the shaft of the drum, and provided with a fan-wheel to govern the speed, as shown in Fig. 1.

The spring and gearing impart to the shaft and cylinder a steady rotary motion, whereby the coffee is caused to roll and tumble constantly backward within the cylinder.

In practice it is found that a better and more uniform browning of the coffee may be secured by imparting to the cylinder a quick motion endwise, in addition to the rotary motion. This may be accomplished in different ways; but the most simple plan is that represented in Fig. 1, consisting in providing the shaft with a spring, $e$, to urge the cylinder in one direction, and providing the opposite end of the cylinder and the body with fixed cams or inclines $f$ $g$, to act against each other and push the cylinder against the spring. As the inclines ride, one upon the other, they force the cylinder over gradually in one direction, and then the instant that the inclines pass the spring throws the cylinder back with a violent action, thereby causing a thorough turning and commingling of the coffee-grains, and insuring at the same time the discharge of all dirt, dust, husks, and other foreign matters through the gauze.

It will be noticed that a space is left between the body and the frame of the gearing. This is done to avoid, as far as possible, the transmission of heat to the frame and gearing.

I also propose to connect the frame and body by a non-conductor of heat, to secure the more effectually the end above named. On the opposite end of the body from the gearing I mount a coffee mill or grinder, E, of any ordinary or suitable construction, so arranging the same as to receive motion from the gearing which turns the cylinder, either directly from the shaft, as shown, or indirectly therefrom, or in any other suitable manner.

It will be seen that in the drawings the end of the shaft is squared and extended directly into a corresponding opening in the grinding-wheel of the mill. Under this arrrangement the mill rotates at all times with the cylinder. Any suitable clutch or locking mechanism may be employed, however, to connect and disconnect the shaft and grinding-wheel; or, as shown in Fig. 3, a sliding collar on the shaft may be arranged to connect the cylinder or the wheel alone to the shaft at will. As shown in Fig. 1, the mill is provided with a tray or drawer to receive the ground coffee, which also serves to close the opening into the cylinder.

In using the apparatus the drawer or tray is removed, the neck of the cylinder brought opposite the opening in the end of the body, the coffee introduced through the same, and the drawer replaced. The spring is then wound up, the body placed upon a stove, and the cylinder permitted to rotate until the coffee reaches the desired condition. The drawer is then removed and the coffee discharged.

In grinding coffee it is placed in the mill, the spring wound, and the gearing permitted to run without further care or attention. As the spring can be wound very quickly by means of a hand-crank applied to its arbor, the grinding of the coffee thereby saves both time and trouble to the attendant.

If desired, the neck and opening may be so arranged as to discharge the coffee directly into the upper part of the mill in position to be ground.

I also propose to use, when required, intermediate and additional gearing, to give an increased power or leverage to drive the grinding devices.

I also further propose to apply an alarm mechanism to give notice when the spring has run down, so that the coffee is in danger of being burned, and also a stopping device to bring the feed-opening of the cylinder in line with the opening in the case.

Having thus described my invention, what I claim is—

1. In combination with the body having the opening in its end, the internal rotary cylinder provided with the neck $d$, extending against the end of the body, as shown.

2. The combination of a spring and train of gearing with a roasting-drum and a grinding-mill, both arranged to be driven by the gearing, substantially as shown and described.

3. In a coffee-roaster, the combination of a horizontal cylinder or drum and mechanism, substantially such as shown, arranged to impart to the cylinder a continuous rotation about its axis, and also an intermittent and violent reciprocation endwise.

4. The combination of the rotary gauze drum or cylinder, the actuating-spring and gearing, spring $e$, and inclines $g$, as shown.

5. The tray or drawer of the grinding-mill, arranged to close the opening to the interior of the cylinder, as shown.

FERDINAND GOLDSMITH.

Witnesses:
   P. T. DODGE,
   WILLIAM W. DODGE.